United States Patent [19]
Pickover

[11] Patent Number: 6,057,834
[45] Date of Patent: May 2, 2000

[54] ICONIC SUBSCRIPTION SCHEDULE CONTROLLER FOR A GRAPHIC USER INTERFACE

[75] Inventor: Clifford Alan Pickover, Yorktown Heights, N.Y.

[73] Assignee: International Business Machines Corporation, Armonk, N.Y.

[21] Appl. No.: 09/097,197

[22] Filed: Jun. 12, 1998

[51] Int. Cl.[7] .................................................... G06F 3/00
[52] U.S. Cl. .......................................... 345/329; 345/349
[58] Field of Search ..................................... 345/326, 329, 345/332, 333–335, 346, 348, 349, 352, 354, 355, 350, 351, 353

[56] References Cited

U.S. PATENT DOCUMENTS

| | | | |
|---|---|---|---|
| 5,184,319 | 2/1993 | Kramer | 364/806 |
| 5,310,349 | 5/1994 | Daniels et al. | 434/350 |
| 5,320,538 | 6/1994 | Baum | 434/307 |
| 5,371,852 | 12/1994 | Attanasio et al. | 395/200 |
| 5,767,852 | 6/1998 | Keller et al. | 345/348 |
| 5,801,699 | 9/1998 | Hocker et al. | 345/348 |

*Primary Examiner*—John E. Breene
*Assistant Examiner*—Greg Cunningham
*Attorney, Agent, or Firm*—Louis J. Percello

[57] ABSTRACT

Using a graphical user interface (GUI), users manipulate, organize, classify, and/or arrange web-page icons by having the icons be consolidated in schedule-control icons (SCI) containing regions. Regions may be on icons, windows, or other graphical objects. For example, when an icon representing a web page is dragged close to a region on an SCI, the subscription update schedule for that web page is changed. The schedule value depends upon to which region on the SCI an icon is dragged.

34 Claims, 8 Drawing Sheets

ICONIC SUBSCRIPTION SCHEDULE CONTROLLER FOR A GRAPHIC USER INTERFACE

FIELD OF THE INVENTION

This invention relates to computer graphical user interfaces. More specifically, the invention relates to a graphical user interface (GUI) allowing users to conveniently specify and alter World Wide Web page subscriptions on a computer screen.

This invention also relates to transfer of information over communication networks, and in particular to the transfer of discrete sets of information (pages) from one computer to another over a communication network.

BACKGROUND OF THE INVENTION

Graphical user interfaces (GUIs) provide ways for users of computers and other devices to effectively communicate with the computer. In GUIs, available applications and data sets are often represented by icons consisting of small graphical representations which can be selected by a user and moved on the screen. The data sets (including pages of information) and applications may reside on the local computer or on a remote computer accessed over a network. The selection of icons often takes the place of typing in a command using a keyboard in order to initiate a program or accessing a data set. In general, icons are tiny on-screen symbols that simplify access to a program, command, or data file. Icons are often activated or selected by moving a mouse-controlled cursor onto the icon and pressing one or more times on a mouse button.

GUIs include graphical images on computer monitors and often consist of both icons and windows. (GUIs may also reside on the screens of televisions, kiosks, personal digital assistants (PDAs), automatic teller machines (ATMs), and on other devices and appliances such as ovens, cameras, video recorders and instrument consoles.) A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

Although the use of GUIs with icons usually simplifies a user's interactions with a computer, GUIs are often tedious and frustrating to use. Icons must be maintained in a logical manner. It is difficult to organize windows and icons when many are similarly displayed at the same time on a single device.

In a drag-and-drop GUI, icons are selected and moved to a target icon to achieve a desired effect. For example, an icon representing a computer file stored on disk may be dragged over an icon containing an image of a printer in order to print the file, or dragged over an icon of a trash can to delete the file. An icon representing a page of information on the World Wide Web may be selected and dragged to a trash can to delete the link to the page of information. The page of information may be on the local machine or on a remote machine. A typical user's screen contains many icons, and only a subset of them will at any one time be valid, useful targets for a selected icon. For example, it would not be useful to drag the icon representing a data file on top of an icon whose only purpose is to access an unrelated multimedia application.

Computerized information gathering using such entities as the World Wide Web is based around the concept of "pages" of information. A page of information consists of any number of textual, graphical, audio/visual, or other elements (i.e. multimedia information) that are sent upon receipt of a request for that particular page by a computer connected to the network from a server (remote) computer that may serve as a host repository for many such pages.

The World Wide Web is an extremely-widespread information service that can deliver both text and non-text multimedia information (audio, video, graphics). The Web is a global hyptertext system. Hypertext is a computer-based protocol for linking documents to other related documents. Links are embedded within the text of a document in the form of highlighted words or images and, when activated, cause the linked document to be retrieved and displayed. The linked document can itself contain links to other documents, and so on, ad infinitum. Links are most commonly activated by pointing and clicking with a mouse.

A computer system may be attached to an information network, such as the World Wide Web, by means of a modem or other network connecting device. Often the user is connected not directly to the information network itself but to an interim computer (network provider) with a direct connection.

The user of the requesting computer (i.e. local computer) may request a specific page by sending a specific page name (such as the Universal Resource Locator, or URL, on the World Wide Web) to the network. This name is interpreted and routed to the correct server, which places the requested page data on the network for retrieval by the requesting computer. As mentioned, a page of information may contain "links" (textual or graphical pointers to other pages of information) that are available to the user of the requesting computer. If the user selects one of these links, the name of the associated information page is then requested and the process continues as described above. In this way, the user of the requesting computer can navigate the information network, requesting pages as desired.

Examples of computers communicating over a network are given in U.S. Pat. No. 5,371,852 to Attanasio et al., issued on Dec. 6, 1994. A description of network configurations that are used to identify and search for information in databases in described in U.S. patent application Ser. No. 08/677,059, now U.S. Pat. No. 5,913,208, to Brown et al, filed on Jul. 9, 1996. These references are herein incorporated by reference in their entirety.

Modern web browsers, such as Microsoft Internet Explorer 4.0, allow users to "subscribe" to web pages specified by URLs. For example, users can schedule daily, weekly, or monthly updates for web sites they subscribe to. Subscribing to a web site enables users to automatically update information from a web site on a scheduled basis, without having to visit the site and refresh the content manually. One typical way of setting up a subscription to a web page (such as accomplished when subscribing via Microsoft Internet Explorer 4.0) is to view the web page in a browser, add its URL and/or title to a collection of "favorites" (i.e favorite URLS) in a menu, and request subscription notification options, such as: partial or full subscription to a page or only e-mail notification that a page has changed. A full subscription may refer to the downloading of a page and all its linked information, whereas a partial subscription may refer to downloading a page without its linked information. "Favorites" refers to a collection of URLs that a user categorizes as distinctive because, for example, of the pages' utility or because the user wishes to often visit the pages corresponding to the URLs.

Another form of subscribing is through "channels." Channels are Web sites that are automatically updated on a user's computer according to a schedule specified by the content provider. Channels can be displayed in the browser like other web pages, or as a full-screen window, or on a user's desktop. Some channels are also designed to be used as a screen saver.

One common way for users to organize collections of links to web pages, for faster access, involves the manual addition of text to a Favorites menu. Some web browsers permit hierarchical arrangement of favorite URLs using a list of folders. Each folder contains a list of links (specified by URLs) to web pages. For example, web pages may be organized by folders corresponding to topics. As a specific example, a user could create a folder named "Music" for storing URLs corresponding to web pages listing musical events and reviews.

Users may also create desktop "shortcuts" to a current page. (The term "shortcut" is standard in the Microsoft Windows operating system.) These shortcuts are represented by icons on the "desktop" GUI. (In the Windows operating system, the term "desktop" 142 refers specifically to the background of the screen on which windows, icons, and dialog boxes appear. Users can change the desktop color and pattern.) These shortcuts may be created by dragging a link from the web browser to a location on the desktop GUI. If the user clicks on these iconic shortcuts, the web browser is invoked, and the page of information corresponding to the link represented by the shortcut is displayed in the browser. Shortcuts generally permit fast access to programs or web site links.

Users of computers and other systems sometimes desire to conveniently specify and control the relative update times of subscriptions and channel information. Users also desire to organize and consolidate desktop icons representing links to web pages. "Update time" refers to the time interval between acquisitions of new material from a subscribed web page. Typical update times include "hourly," "daily," and "weekly." Web browsers generally have textual and menu-list methods for specifying web-page subscription. However, these methods are not intuitive to users and give little graphical indication or consolidation of update times for web pages specified by iconic shortcuts on a desktop. For example, in the Microsoft Internet Explorer 4.0 browser, subscription schedules are displayed in text lines corresponding to each web page name. In particular, a web page name and URL are listed next to words like "daily" or "weekly". These lists are not apparent on the desktop.

PROBLEMS WITH THE PRIOR ART

There are problems with prior-art GUI and web-browser controls of scheduling and organization of iconic links to web pages on a desktop. For example, there is a need in the prior-art for improved graphical means for controlling schedule times or for organizing and managing the desktop icons (e.g. shortcuts to links to webpages hereafter also referred to a "iconic shortcuts"). For example, most prior art does not allow users to visually consolidate, control, and organize iconic shortcuts into different schedule or subject categories on the user's desktop.

OBJECTS OF THE INVENTION

An objective of this invention is an improved system and method for altering scheduling times and using graphical displays on graphical interfaces.

Another objective of this invention is an improved system and method for organizing, displaying, managing, and selecting icons and/or windows, usually corresponding to links to web sites, on a computer graphical interface.

SUMMARY OF THE INVENTION

This invention improves upon typical alphanumeric commands (typically entered at the keyboard), or menu selections, and allows users to alter the scheduling times for web page subscriptions in a graphical manner useful in drag-and-drop environments. In particular, a graphical user interface is described that conveniently allows web page scheduling to be controlled. Such an interface could be used in three-dimensional (e.g. virtual reality) environments in addition to standard two-dimensional GUI presentations.

This invention permits users to conveniently alter the scheduling times of one or more web pages represented by GUI icons and windows, particularly in a drag-and-drop interface but also in any presentation where changing scheduling time is desired. In a preferred embodiment, as a result of selecting and dragging an iconic shortcut (for a URL) to a "schedule-controller" icon or region of the screen, the update schedule of the dragged icon is specified. The schedule-controller icon contains different regions that may be visually distinguished, and each region represents a different update interval. In other words, when a user drags an icon (representing a link to a web page) to a region of the schedule-controller icon, the update schedule is changed to the schedule associated with that "region" of the schedule-controller. For example, the schedule-controller icon may be represented by a rectangular strip. One end may be dark blue representing very infrequent update times, such as would be given to a web page that updates only every month or never updates. The other end may be red indicating frequent updates, for example, hourly or every minute. A continuum of colors (e.g. blue, green, yellow, orange, and red) may be used to give the users a visual indication of update schedule. Alphanumeric designators positioned on the icon may also give schedule information. The regions may simply be locations on a strip, or cutouts, into which the icon (i.e. iconic shortcut to a link to a web page) is placed. The schedule-controller icon thus creates an interactive visual index for the user, and/or guides the user to specific regions of the schedule-controller in a drag-and-drop interface. If desired, the new schedule time for the web page represented by the dragged icon may be reflected in the color of the dragged icon. Icon colors may also be controlled by the operating system and may change when the operating system changes the update schedule times of web links represented by icons. The schedule time of the web pages can again be altered by dragging the icon representing a web link to another region of the schedule-controller icon.

Additionally, the web pages represented by icons can be dragged to consolidation icons that visually consolidate a group of web page icons so that users can get an immediate feel for the organization of web page links by topic and class. These consolidation icons may be schedule-controller icons for which the update time is infinitely long, i.e. the web page never updates and there is no subscription. In this case, their primary function is to visually cluster the adjacent iconic shortcuts located anywhere on the desktop.

DETAILED DESCRIPTION OF THE INVENTION

Figure 1:
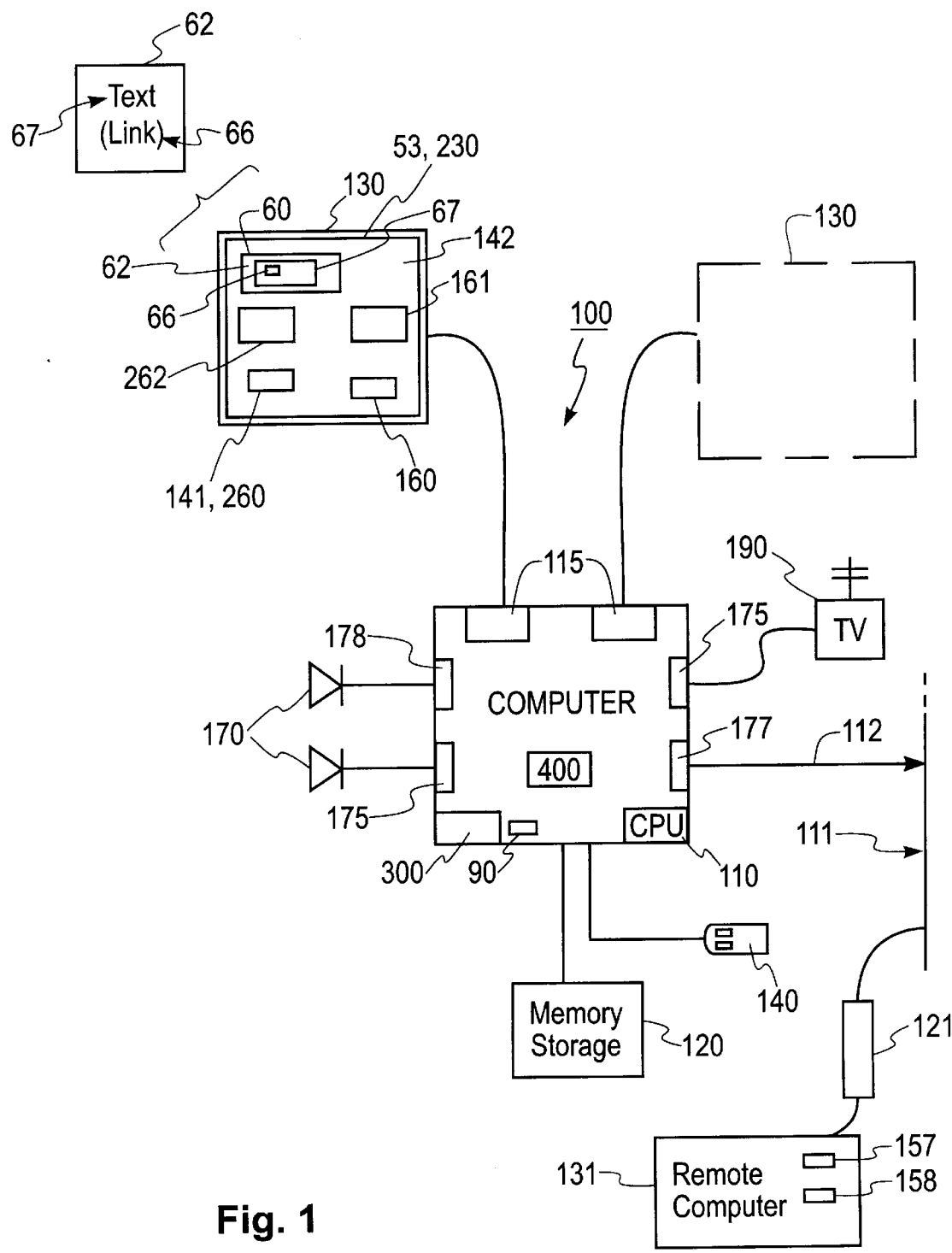
FIG. 1 is a block diagram of the hardware and one preferred embodiment of the present invention.

This invention permits users to control the update schedule times of web pages represented by graphical objects, e.g., icons and windows, using schedule-controller icons or regions of the computer screen. A schedule-controller region is a location on a graphical object (or computer screen) to which other graphical objects on a GUI are moved. These graphical objects can be represented on the GUI by one or more GUI objects 161 that include: icons 161 with static or animated graphics, text, multimedia presentations, and windows displaying TV broadcasts. GUI objects 161 could also include three dimensional images, for example, those used in virtual reality applications. In a preferred embodiment, an icon may be dragged to a schedule-controller icon so that the subscription schedule for a linked web page represented by the icon is altered by its position relative to the schedule-controller icon.

The present invention is capable of running on any general purpose computer system or computer-controlled GUI (e.g. a television or virtual reality system), including GUIs that have the ability to present multimedia and/or virtual reality information. One preferred embodiment is represented in a block diagram in FIG. 1. A computer system 100 comprises a central processing unit (CPU) 110, memory storage device 120, one or more monitors or graphical interfaces 130 (controlled by one or more known monitor adapter cards 115), and selection device 140 such as a mouse or speech recognition system 178. In one embodiment, an IBM IntelliStation 100 comprises a central processing unit (CPU) 110, memory storage device 120, one or more monitors 130, and a mouse 140. The mouse 140 may be used to select GUI objects 161, like icons 161. On an IBM IntelliStation, multiple monitors 130 can be controlled by multiple monitor adaptor cards. The computer system 100 may also have audio input/output capability 170. Such adaptors 175 may also be used to display TV broadcasts/signals 190, e.g. "picture-in-picture" of TV broadcasts, and other full motion video and sound audio/visual on the monitors 130. In addition, speech synthesis or speech recognition 178 may be provided. For example, see IBM's ViaVoice product. (ViaVoice is a trademark of the IBM corporation.)

In an alternative embodiment, the CPU 110 can be connected 112 via a network adaptor 177 to connect the system 100 to the network 111. Network adaptors 177 are well known. Three examples 177 include token ring adaptors, ethernet adaptors, and modems. The system 100 can be connected to other monitors 130 through a client/server network (or LAN 111).

Systems that can be used to display graphical images, like icons and windows, are well known.

GUIs can be used to control any apparatus having a monitor. In the field of television (TV), channel selection can be performed by selecting an icon consisting of the animated video broadcast on a given channel frequency. This graphical user interface 53 may include display of an application 60 that displays information pages 62 using any known browser 90. The information pages may include graphical, audio, or text information 67 presented to the user via the display screen monitor 130, speakers 170, or other output device. The information pages may contain selectable links 66 to other information pages 62, where such links can be activated by one of the input devices 140, 178 to request the associated information pages. This hardware is well known in the art and is also used in conjunction with televisions ("web TV") and multimedia entertainment centers. Also connected to the network 111 are one or more server computers 131 (usually remote computers) by means of their own connecting device 121. Those skilled in the art will appreciate that the connecting device 121 may take various forms, including modems, token-ring hubs, and other network-enabling devices depending on the capabilities and technology of the connecting devices. The pages 62 are usually addressed and found using an alphanumeric name called a Universal Resource Locator (URL) 157. For example, http://www.ibm.com is the URL for IBM's web page. The information 158 for this page, often in the form of hypertext markup language (HTML), is stored on a computer 130 that is remote to the user's computer 100. Iconic shortcuts 141 (on the desktop 142) to links 66 to web page (information) 158 may reside on the GUI such that when selected, the web page 67 is displayed by the browser 90. In the Microsoft Windows operating system, the properties of iconic shortcuts 141 are typically stored in \Windows\Profiles\Administrator\Desktop and appear on the GUI desktop 142 in a location on the desktop that may be changed by dragging with a mouse. Iconic shortcuts may also be deleted by various means. The properties of iconic shortcuts include the date they were created and what graphic appears in the icon. A novel schedule-controller icon 262 and a novel process 400 is shown in FIG. 1 and described below.

Figure 2:
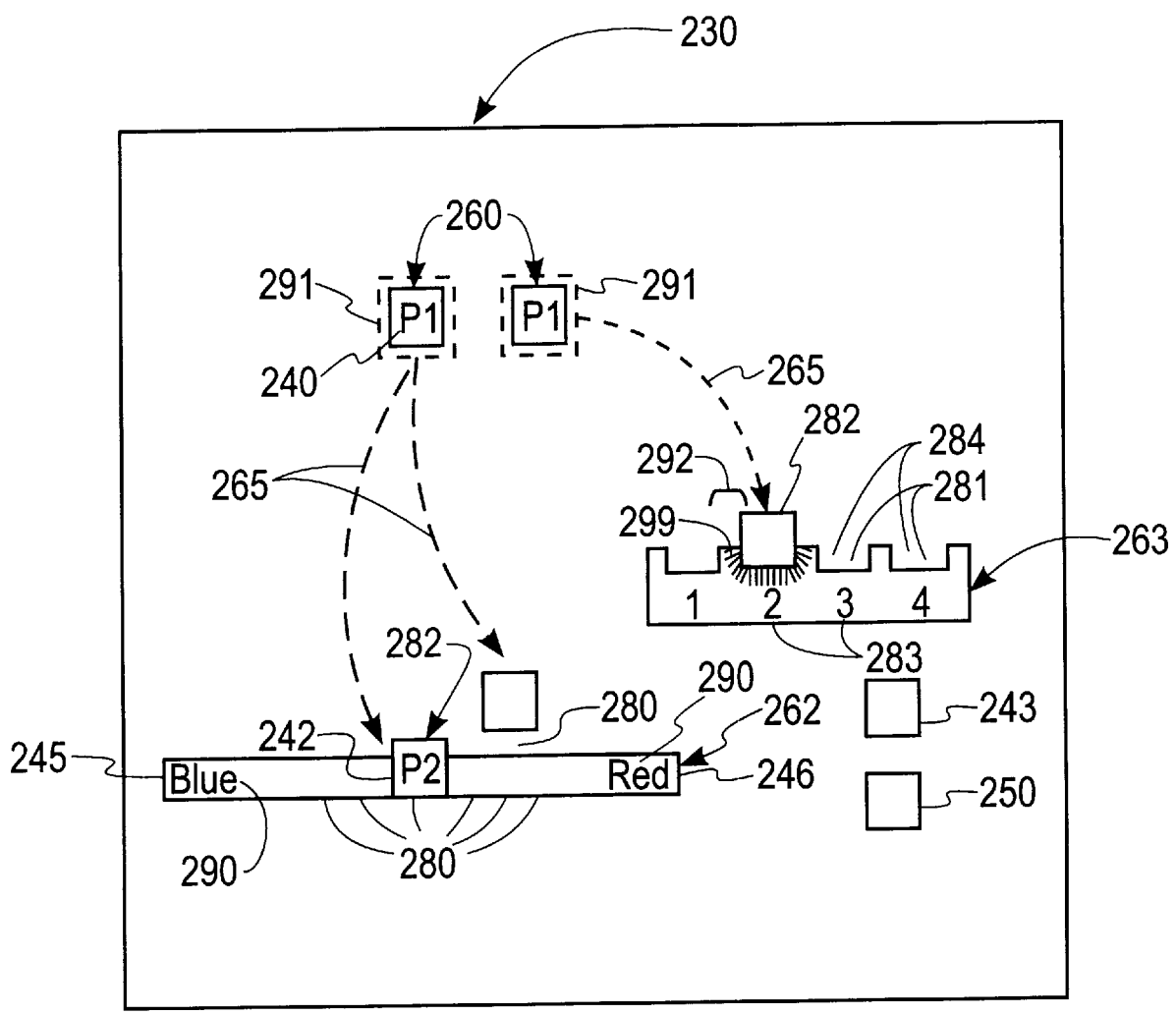
FIG. 2 is a drawing of a monitor with graphical images/selectable items on its graphical interface.

FIG. 2 is a block diagram of a GUI 230 with icons 161 (see FIG. 1) including schedule-controller icons (SCIs) 262, 263 and icon shortcuts 141, 260 representing links to web pages 62 (in FIG. 1). As an example, in the Microsoft Windows operating system, schedule times may be daily, weekly, or monthly and these parameters are used by the Microsoft Internet Explorer and operating system to perform updates to web sites that are subscribed to. Users specify update values in a menu with text. In the present invention, the user uses a selection device such as mouse 140 to select 291 an icon 260 and drags 265 the icon to a schedule controller icon, 262 or 263. If the icon 260, representing a link to a web page, is touching or close (within a threshold distance 280) to the schedule-controller icon 262, then the schedule for the web page is changed from its initial value p1 240 to a new value p2 242. In other words, "closeness" of an icon is determined by computing the distances from the selected icon 260 to regions 284 of SCIs 262, 263 displayed on the GUI. If the distance is smaller than a particular threshold 280, the icon 260 is close to a region of the SCI.

In one embodiment, the schedule-control icons (SCIs) 262 or 263 comprises different regions 284 to which iconic shortcuts 260 (to web pages) are dragged. The schedule-control manager software (SCM) 250 determines near what location 282 icon 260 is positioned using techniques which are well known to those skilled in the art of GUI interfaces.

(See steps 430 and 440 below.) The new update schedule P2 242 is determined (see step 460 below) by the position 282 of icon 260 with respect to the SCI 262 or 263. For example, if icon 260 is at one end 245 of the SCI 262, the web page represented by icon 242 may be assigned an infrequent update schedule P2 242 (for example, it is updated every month). If icon 242 is positioned at the other end 246, the web page represented by icon 242 is assigned a frequent update schedule (for example, it is updated every minute). Intermediate regions 284 may correspond to intermediate values of update schedule. Note that "update" may refer to either the transfer of information 158 from remote computer 131 to local computer 100, usually for the purpose of display by browser 90, or it may mean that the remote pages' information 158 is checked to determine if a change has occurred since the last update, and only this fact (change occurred/not occurred) is conveyed to the user by graphical, textual, audio, or other means.

In addition to scheduling updates, the SCIs 262, 263 may be used to specify the nature of the update (for example, only e-mail notification that the remote web page 158 has changed, or full-page transfer from computer 131 to 100). As a specific example, one end 245 of the SCI 262 may correspond to less network-intensive notification, such as e-mail notification that a remote page of information has changed. The other side 246 may correspond to downloading the entire page of remote information.

The SCI may change one or more graphical attribute such as color 290 in response to changes of characteristics about the information 158 gained when the browser 90 checks for updates. Examples of graphical attributes 290 include color, shading, outlining, brightness, blink rate, text font, etc and are well known. Examples of characteristics of the information 158 include: if the information has been updated or changed, memory requirements of the information, presences or absence of images, information format, bandwidth requirements and/or changes, etc.

For instance, if no change (characteristic) has been detected in the remote pages of information 158 associated with any iconic shortcuts 260 close to SCI 262, then the SCI 262 may be white (graphical attribute), otherwise it may blink or turn red (graphical attribute). The iconic shortcuts 260 may also change graphical attribute in a similar manner. (Changes in graphical characteristics of the iconic shortcuts and SCIs are carried out in step 470 in FIG. 4.)

Figure 6:
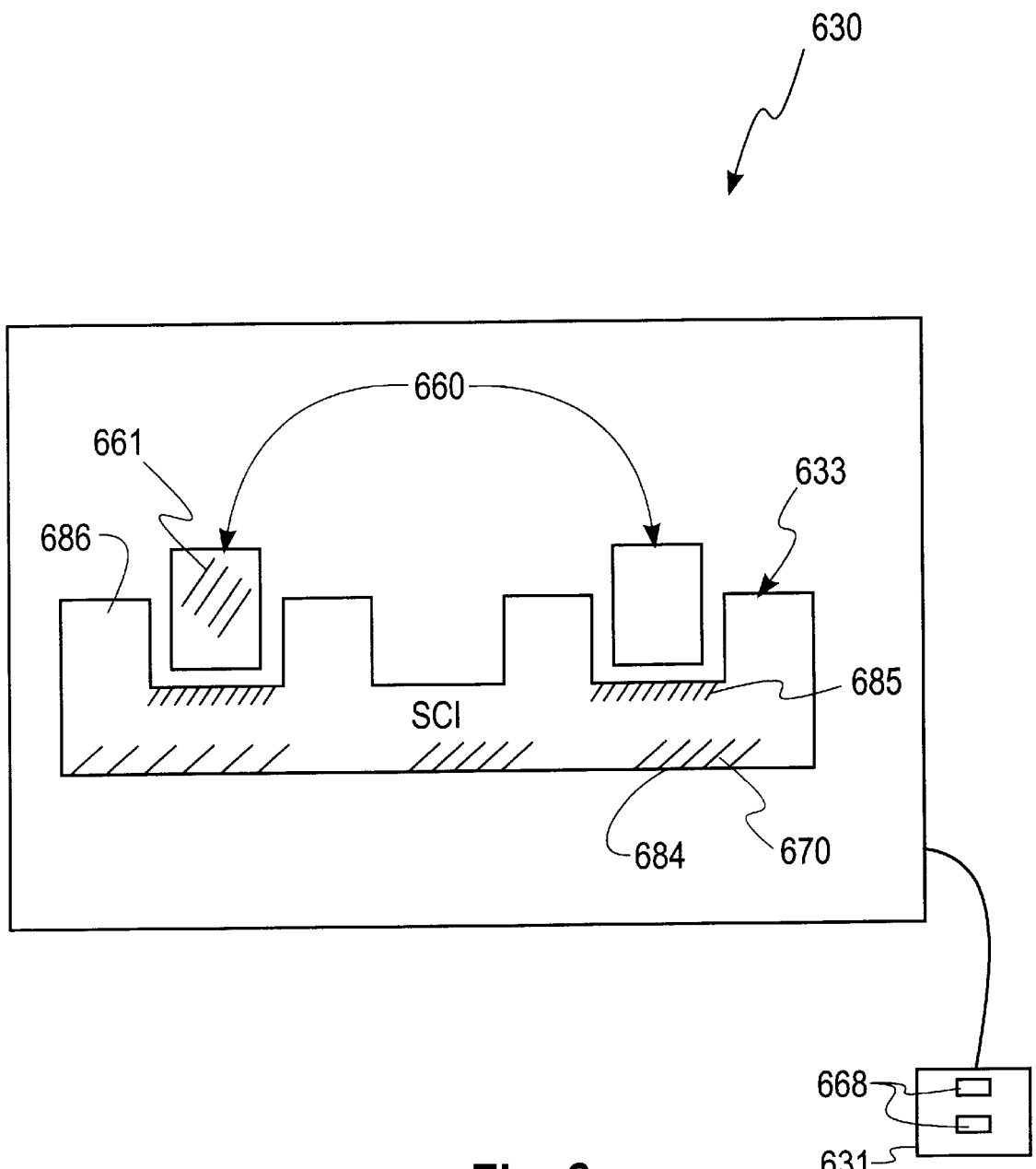
FIG. 6 is a drawing of a monitor with graphical images/selectable items on its graphical interface.
Figure 7:
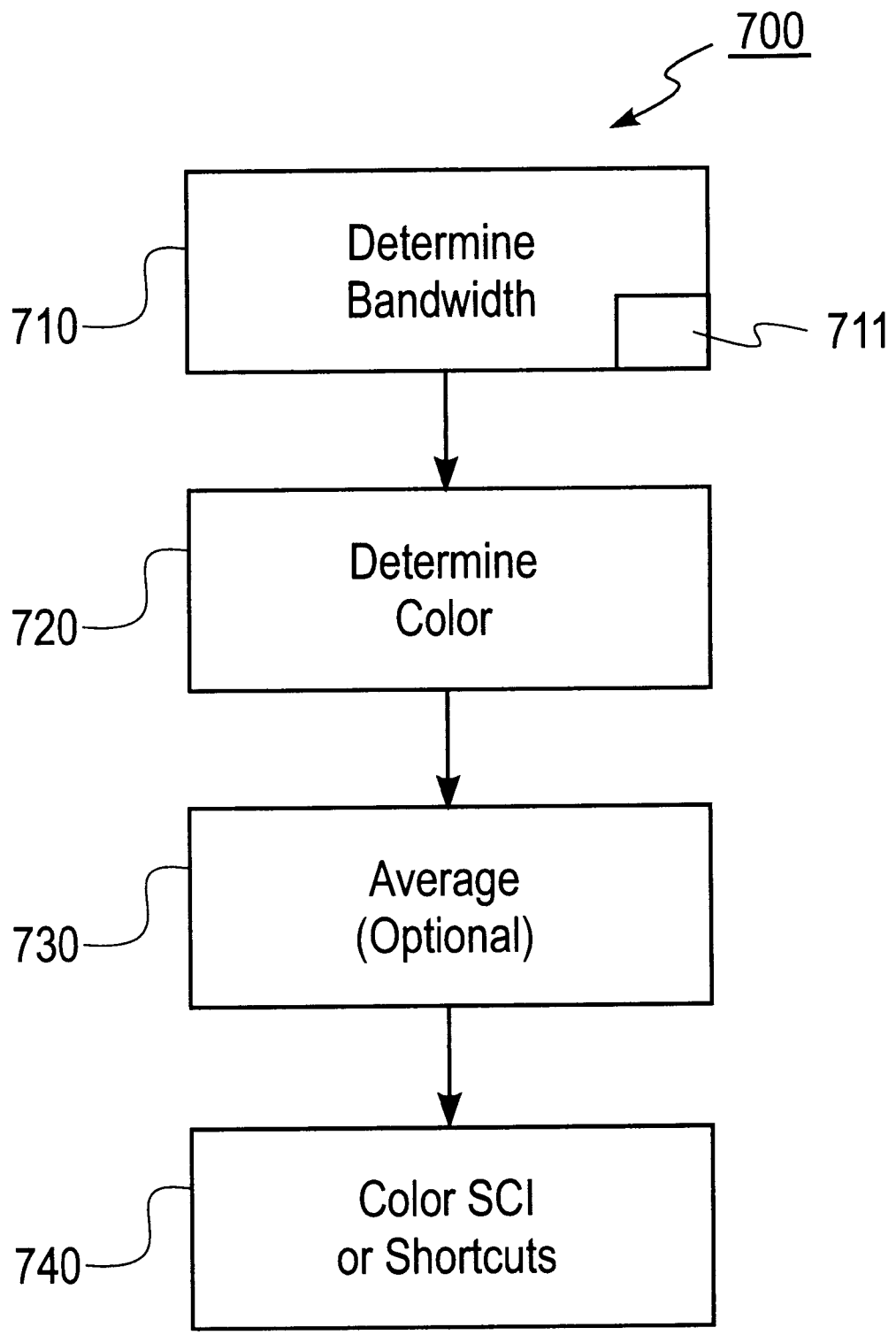
FIG. 7 is a flow chart showing the steps of one preferred method of the present invention for changing the graphical attributes of the schedule-controller icon and iconic shortcuts.
Figure 8:
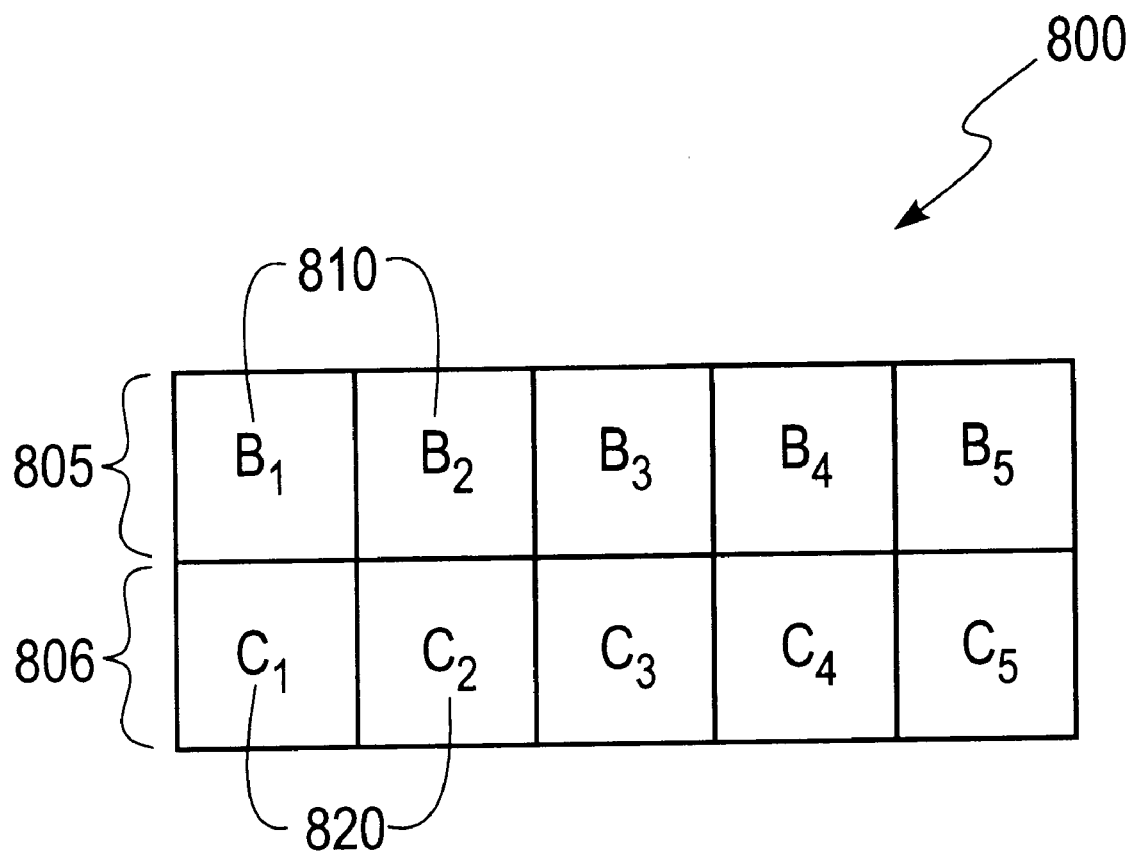
FIG. 8 is a block diagram of a data structure that defines the graphical attributes associated with different regions of the schedule controller icon.

The relation of these changes to remote information gained is described in the descriptions for FIGS. 6, 7, and 8.)

The specific mapping of positions to update schedule values P2 242 can be carried out by the SCM 250 by comparing the position 282 of icon 260 to values stored in a schedule file 243 which may be stored on disk. (File 243 is described in the description of FIG. 5.)

The SCI 263 may also contain graphical indications of regions 284, such as cutouts 281, to which iconic shortcuts 260 may be dragged. In this manner, when the icons are placed in the SCI 263 there can be a graphical indication 292 of the binding to the user. Additionally, the area around the cutout may change color or brightness 299 once an icon 260 is located in the cutout. The use of discrete cutouts 281 may be useful when only a few discrete schedule values may be used (hourly, daily, weekly . . . ). The schedule values may be evident to the user by text 283 written on the SCI, colors 290, and/or other graphical attributes 290.

Figure 3:
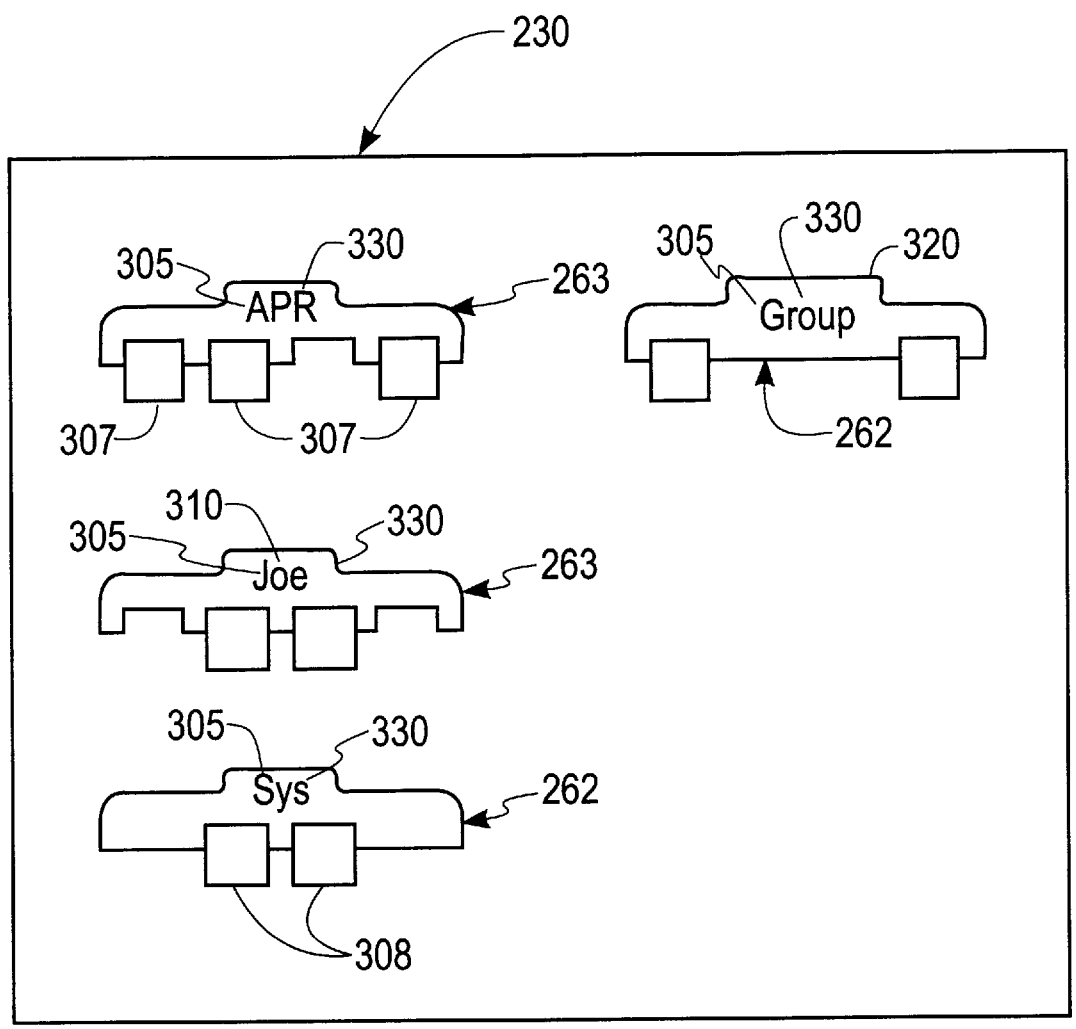
FIG. 3 is a drawing of a monitor with various configurations of graphical images/selectable items on its graphical interface.

FIG. 3 shows an arrangement of multiple SCIs 262, 263 on a GUI 230. Users may have different classes 305 of web pages (represented by iconic shortcuts on the desktop) which may be visually managed, consolidated, or organized by using SCIs for the different classes. For example, one SCI may be used to schedule and/or consolidate web pages that deal with appliances represented by iconic shortcuts 307, 260 to web pages containing information 158 on appliances. Another SCI may be used for web pages dealing with computer system web pages represented by icons 308, 260. System administrators or Internet Service Providers may find SCIs useful for visually controlling and organizing web subscriptions for different users 310 or groups 320. For example, the SCIs 262, 263 can be depicted as shelves with each shelf organizing icons of a particular class and/or schedule of update. In virtual reality systems, the SCIs 262, 263 can be three dimensional shelves, or variations like compartments or cabinets. Virtual reality systems are well known, for example, see U.S. Pat. No. 5,310,349 to Daniels et al. issued on May 10, 1994 which is herein incorporated by reference in its entirety.

Text 330 may appear on the SCIs to give users additional feedback as to the class of applications represented by a particular SCI. When used to schedule subscriptions on remote systems, such as server computers on the World-Wide Web, a graphical consolidation of iconic shortcuts 260 into classes 305, as shown in FIG. 3, may be especially useful. For example, users who pay more money to an Internet service provider for "premium" web service may have more rapid update times when running server programs or getting network access than those users who pay less.

Figure 4:
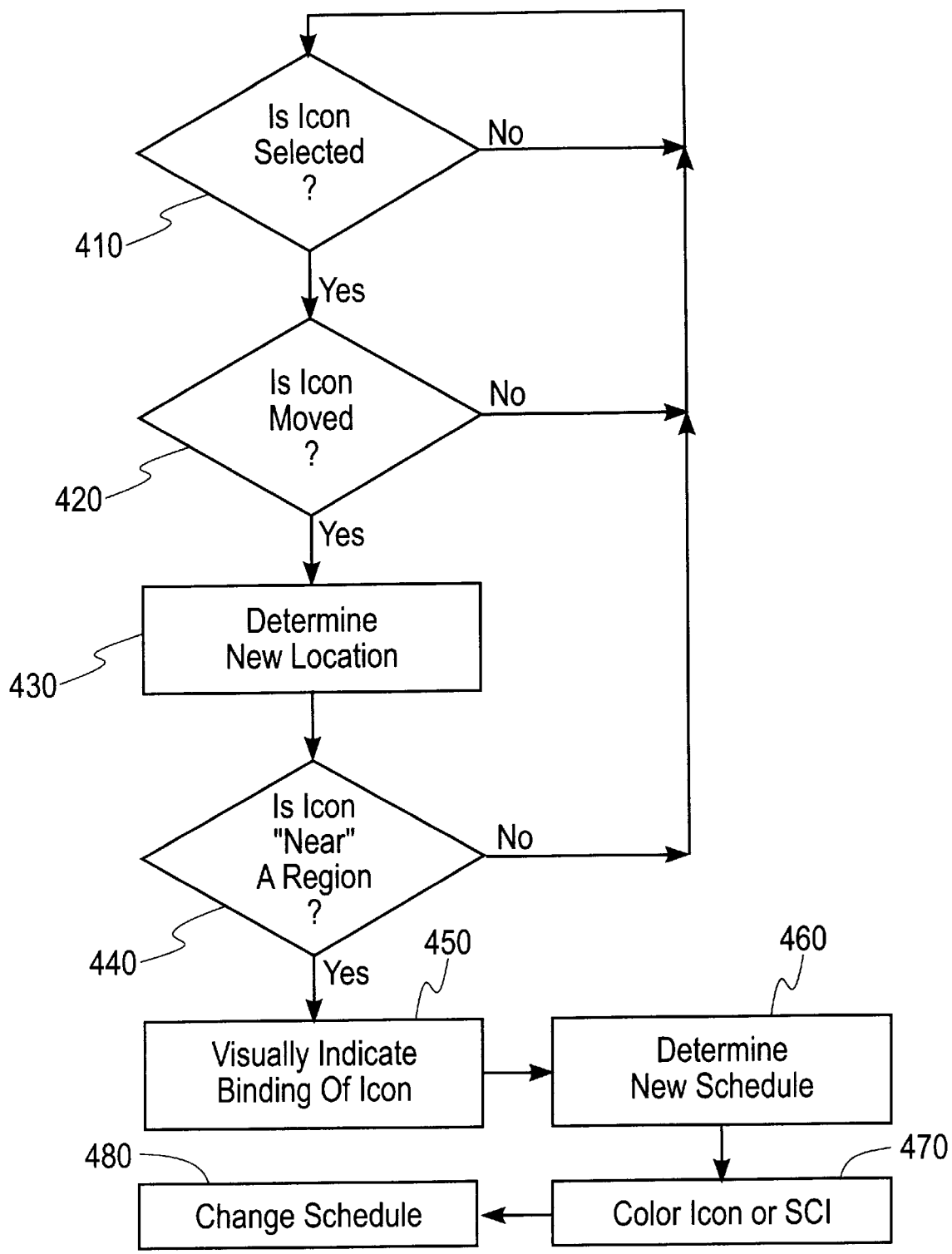
FIG. 4 is a flow chart showing the steps of one preferred method of the present invention.

FIG. 4 is a flow chart showing the process 400 performed for a preferred version of schedule changing with SCIs 262, 263 executed by system 100. In step 410, a program checks if an icon 260 (e.g. iconic shortcut to a web page) is selected. The selected icon 260 may be selected by any selection method: e.g., pointing and clicking or by an application program. Using known techniques, if the icon is moved 420, its new location is determined 430. If the icon is near (within a threshold distance 280 from) an SCI region 284 (step 440), then a visual indication 450 of placement such as changing color or brightness 299 of a region 284, or other graphical attribute 290, optionally may be given. As stated in the description for FIG. 2, the regions 284 may be graphically depicted as cutouts to help give users a graphical (visual) indication of the placement. Also as mentioned in the description for FIG. 2, "nearness" or "closeness" is determined 440 by computing the distances from the selected icon to all SCI regions 284 on the GUI. In one preferred embodiment, distances are computed using known geometrical methods. For example, if (x1,y1) are the coordinates of an icon 260 and (x2,y2) are the coordinates of a region 284, then the distance is d=sqrt ((x2−x1)2+(y2−y1)2). This formula may be extended to include additional variables for higher dimensional spaces, such as in a virtual reality or three-dimensional environment. An SCI table 500 on disk may store the locations of regions 284 and also their associated schedule values as described in the description of FIG. 5.

The new update schedule 242 of a web page represented by an icon 260 is determined 460 by comparing the current schedule value 242 with a value in the data structure 500 which associates icon location (see step 430) and a new schedule value 242. The icon 260 or SCI 262, 263 optionally may change color, brightness, texture, blink rate, shape, size, or other graphical attribute 290 (see step 470). This graphical attribute 290 may be a function of the schedule value 242. For example, an iconic shortcut representing a page with frequent schedule updates may be red. An icon representing a task with a low schedule update rate may be green.

The SCI may changes colors based on the average, maximum, or minimum update value of an attached icon or on the nature of the updates, as explained in the description for FIG. 2.

Finally, the SCM changes 480 the schedule of the process associated with icon 260 to that of the region 284. Changing update schedules is accomplished by standard web-browser methods, such as that provided by the subscription manager in the Microsoft Internet Explorer. Step 480 may issue, for example, a schedule command once an icon 260 is placed near region 284.

Figure 5:
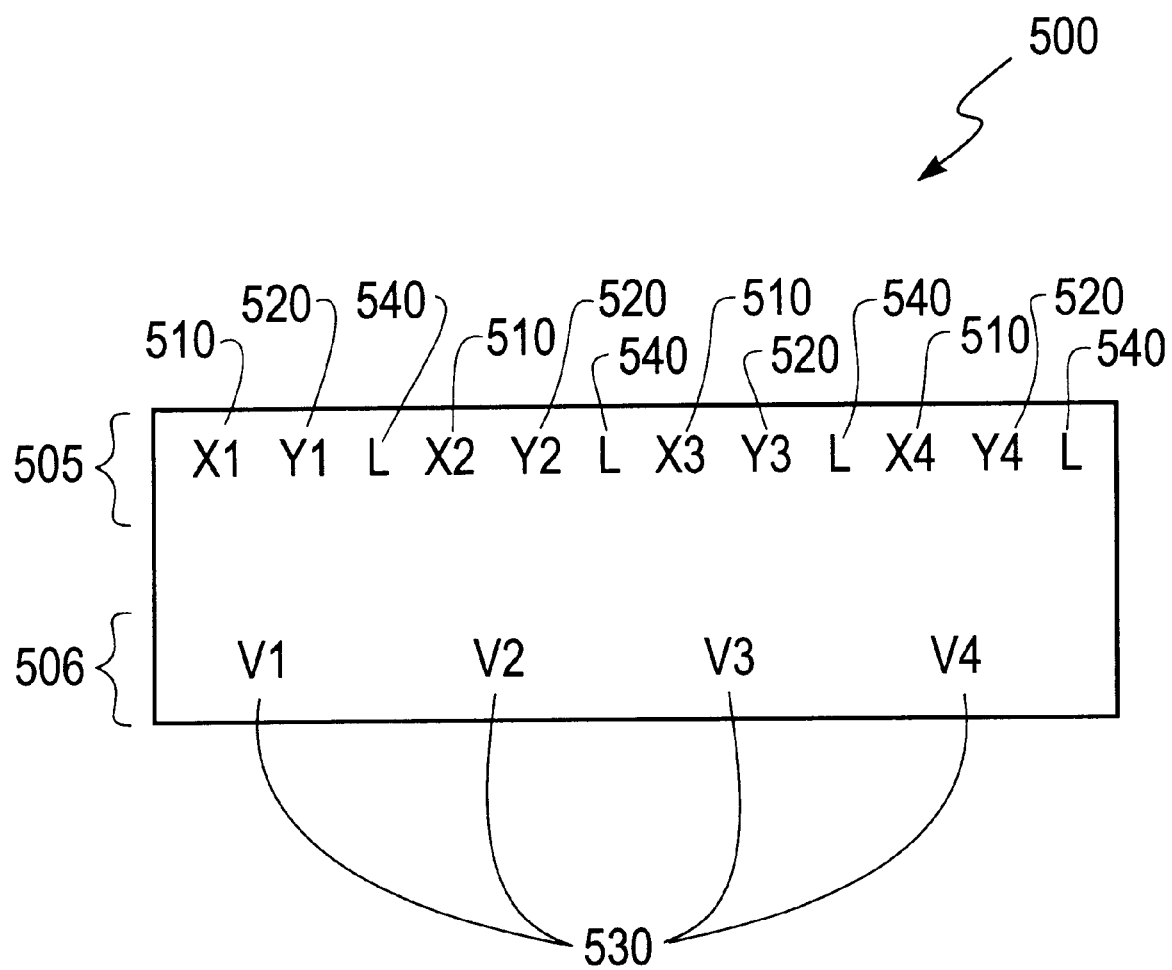
FIG. 5 is a block diagram of a data structure that defines the schedule values (e.g. subscription update intervals) associated with different regions of the schedule controller icon.

FIG. 5 is a block diagram of one typical preferred data structure (table) 500 that is used to contain the positions of SCI regions 284 and their associated schedule values which generally correspond to update intervals for web-page subscriptions. For example, the first row 505 may contain the (x 510 y 520) coordinates specifying the spatial location of regions 284. In a three-dimensional GUI, z coordinates may be added. In the example block diagram in FIG. 5, line 1 (first row 505) contains four (x,y) pairs which may specify the locations of four different regions. Additional coordinates may be used in three- dimensional or virtual reality environments. For example, the first record can be expanded to "x1 y1 z1, x2 y2 z2, x3 y3 z3, x4 y4 z4" to specify four three-dimensional locations of regions. The second row (506) lists schedule values (530) v1, v2, v3, v4 associated with the position of each icon region in the first record. These values are used to specify the subscription schedule (P2, 280 in FIG. 2) of a page associated with an icon 260. These values may be in units of minutes, hours, days, or other convenient intervals. The values may be numeric or alphanumeric text strings, e.g. "weekly", which are parsed or interpreted by the SCM 250. Note that this data structure can also be used with an SCI 262 that appears to have a continuous range of schedule values by including many values for coordinates and schedule values in rows one 505 and two 506 of the data structure. It is also possible to have the SCM 250 interpolate between schedule values 530 when an icon's position coordinates are between SCI coordinates 510, 520.

FIG. 6 is a block diagram of a GUI 230, 630 with icons 161 (see FIG. 1) including schedule-controller icons (SCIs) 263, 633 and icon shortcuts 260, 660 representing links to web pages information 668 on a computer (131,631) which may be remote.

As mentioned in the description for FIG. 2, the SCI (263, 633) may change one or more graphical attribute such as color 290 in response to changes of characteristics about the information (158, 668) gained when the browser 90 checks for updates. As an example, the color 670 of the SCI regions (284, 684), or color 685 of areas around the cutouts, or color 661 of the iconic shortcuts (representing links to remote information) may change when the bandwidth to the remote information is queried, as described in the description for FIG. 7. For instance, the color red may be used to indicate low bandwidth, and the color green may be used to indicate high bandwidth, with intermediate colors used to indicate intermediate bandwidth speeds. This means that not only does the SCI control information about update schedule, but it also provides feedback about the bandwidth, or other characteristic, relating to the remote information. For example, this may be useful when a user often sees that the bandwidth to a particular site is low—meaning the access to the site is slow due to network traffic, overloaded server 631, or other reason—and therefore the user may wish to request less frequent updates by moving iconic shortcut 660 to a region of the SCI 633 corresponding to less frequent updates. The SCI may also have an overall color 686 corresponding to some mathematical relation between all the band-widths for all bound iconic shortcuts 660. As an example, the overall color may reflect the average bandwidth for all bound iconic shortcuts.

FIG. 7 is a flow chart showing the process 700 performed for a preferred version of changing the color (or other graphical attributes) 684 of of the SCI regions, or color 685 of areas around the cutouts, or color 661 of the iconic shortcuts (representing links to remote information) in response to changes in the bandwidth to remote information. In step 710, the bandwidths to one or more remote information pages 668 are queried. Bandwidth may be determined by quickly probing ("pinging") each remote information page 668. (Methods of probing information pages designated by URLs 157 are well-known to those skilled in the state of the art.) Based on the determined bandwidth, which can be thought of as an access time to the remote information, a color is determined.

In step 710, it is also possible to query other characteristics of the information 158 such as if the information has been updated or changed, memory requirements of the information, presence or absence of images, information format, etc., and changes of these characteristics. These characteristics may also be represented as graphical attributes on the SCI or iconic shortcut, as described for the example of "bandwidth" in the following paragraphs. These characteristics may be determined once the information 158 has been downloaded to the computer 100 with memory storage device 120 or when browsed by browser 90, or by other means such as by querying the information 158 in a manner similar to the way bandwidth is queried. For example, once the information 158 is stored locally in device 120, it is possible to determine the information's size, format, presence of images, and changes from prior characteristics.

The new color 661, 670, or 685 of the SCI regions, cutouts, or iconic shortcuts are determined 720 by comparing the current bandwidth value 711 with a value in the data structure 800 which associates bandwidth and color. (Instead of color, we may also control other graphical attributes in a similar manner: brightness, texture, blink rate, shape, size, etc.) The SCI may have an overall color 686 based on the average of all bandwidths corresponding to all bound iconic shortcuts 660. This average, or other mathematical relation such as maximum or minimum, is determined in step 730.

Finally, the SCM changes 740 the colors on the SCI or iconic shortcut according to the determined bandwidths.

As an example use, if a remote information page 668 is unavailable, the color of the SCI or iconic shortcut corresponding to the page turns red, or has a red border around it. If the remote information is slow to access, the color turns orange. If the site is fast to access, the color turns green. In this manner, a user can quickly determine at a glance which subscribed information pages are easy to access from the current computer without having to manually access each link.

While it is true that Internet characteristics such as traffic flow are constantly changing, and a bottleneck may exist at one or more points between the user's browser and the accessed page of information, the use of this method and system gives a visual index of overall changes through time.

FIG. 8 is a block diagram of one typical preferred data structure (table) 800 that is used to contain bandwidth values and their associated color values used to color SCI regions, cutouts, and iconic shortcuts. For example, the first row 805 may contain the bandwidth values 810 B1, B2, B3, B4, B5, . . . The second row (806) lists color values (820) C1, C2, C3, C4, C5, . . . associated with the bandwidth to a remote site. These values are used to specify the colors on the GUI. These values may numerical or text strings such as "red" and "green" which are parsed or interpreted by the SCM 250. Note that this data structure can also be used with an SCI 262 that appears to have a continuous range of colors by including many values for bandwidths and color values in rows one 805 and two 806 of the data structure. It is also possible to have the SCM 250 interpolate between color values 820 when a bandwidth is between bandwidth values 810.

There are many applications for SCIs. For example, they may be used to visually consolidate iconic shortcuts to webpages in different categories on a user's screen (e.g., icons representing music pages, finance pages, stock market pages, and health pages may be separately organized.) They can be used to conveniently change schedule times for subscriptions to web pages represented by icons or even to turn off a subscription (i.e. give them no schedule). They are more conveniently used than typical menu items or alphanumeric text entry which sometimes require users to be aware of ranges of meaningful schedule values. SCIs are not only used to specify schedule values, but they also give users a continuous visual "index," right on the desktop, of the schedules of various web subscriptions. This is not feature of typical alphanumeric strings used to enter schedule values.

The SCM may move icons along (or within) an SCI based on Internet traffic load or the subscription rate for competing subscriptions. For example, a user may place an icon at a rapid schedule region on an SCI (e.g. SCI 262), and other icons already on the SCI may slide by moving on the display to a lower schedule.

This may be useful for managing schedules when there exists finite computational and network bandwidth resources. Some icons on the SCI may be locked so that they do not move in response to placement of other icons on the SCI, while others may be mobile. The locking of icons can be controlled in a file, such as the one shown in FIG. 5. This may be accomplished, for example, by adding a value L 540 to the row 505 in the data structure 500 that contains position coordinates 510, 520. A value of 1 for L can signify that an icon at location 510,520 is not to be moved in response to placement of icons on the SCI. A value of 0 for L can signify that the icon at this location may be moved in response to placement of icons on the SCI. The lock value L 540 can also be used to signify that users can not move a particular icon from the SCI without special privileges. This can be useful, for example, by system administrators who allow ordinary or beginning users to see an icon in the SCI but who do not wish ordinary users to be able to alter the subscription update schedule.

The SCI regions in the present invention need not consist of a visually distinguished regions on an icon. Such regions may also be visible or invisible spatially-distinguished regions of the computer screen to which icons are dragged to control the schedule of the corresponding web page subscriptions. For example, the act of dragging an icon to the "upper right" portion of the computer screen may constitute a schedule specification for the web page represented by the dragged icons. Upper right may designate rapid schedule tasks. Lower left can designate infrequent schedule tasks. The dragging and selecting of the icons may be done by the user or (automatically) by the computer system. In order to make use of these spatially-distinguished regions of the computer screen (i.e. GUI), as mentioned in the description for FIG. 4, "nearness" or "closeness" is determined 440 by computing the distances from the selected icon to all regions on the GUI. In this example, the regions (e.g. 284 in FIG. 2) are not part of an icon but are part of the GUI and may be invisible, or differentiated by color, outline, brightness or other graphical feature. The region positions and associated schedule values can be stored in a data structure (table) 500 as show in FIG. 5. These regions may be displayed in a separate window on the computer screen so as not to affect the layout of graphical objects (e.g. icons) on the user's desktop. This separate window may contain various icons copies of which are also on the primary window.

As discussed, this invention may have particular value in the management of Internet server computers that run various subscriptions at the request of remote users. The invention is useful for any system with multiple users and processes. Individual users may control their own subscriptions. System administrators may control subscriptions of many different users.

In a three-dimensional (e.g. virtual reality) GUI, users might "grab" a 3-D object representing a web page and move it into a 3-D SCI. As an example, a graphical depiction of a molecule may represent a web page consisting of a JAVA implementation of a molecular dynamics simulation. When the molecule is placed on a particular shelf in a virtual room, the update schedule is altered. This means that a remote simulation may be monitored at intervals set by the SCI. In this case, the shelf is a region of the SCI. The lock value 540 may control whether an object representing a process can be removed from the shelf to change the update schedule. As another virtual reality example, users may be represented as 3-D graphical representations of human bodies. When these bodies are placed on a particular shelf, all subscription schedules of the corresponding users are specified or altered.

With 3-dimensional (e.g. virtual reality) browsers, iconic shortcuts 660 and SCIs 262 may comprise 3-D graphical objects that a user can interact with to initiate or control a link to information 158. For example, a 3-D representation of a lawn mower may appear, and a user may "reach out" and "touch" the mower, using known virtual reality methods such as tactile gloves. This "touching" is a way to select the 3-D iconic shortcut. The lawn mower may represent a real lawn mower or information associated with lawn mowers, such that might be found in a lawn product catalogue. (3-D graphical objects may be useful in a range of commercial product ordering.)

Examples of the use of tactile gloves for receiving a hand of an individual and for detecting and transmitting to the computer as input data representing orientation and movements of the hand of the individual inserted in a tactile glove are given in U.S. Pat. No. 5,320,538 by D. Baum issued on Jun. 14, 1994. This reference is herein incorporated by reference in its entirety.

One particular way in which the virtual object (i.e. 3-D iconic shortcut) may change appearance is a change in transparency and opacity. For example, the mower may gradually change from partially transparent to opaque to indicate information gained 710. For instance, if the information 158 has changed by 50%, the mower may be fifty percent transparent. Graphical methods for changing the transparency of a 3-D object are known to those skilled in the art. Other graphical indications include the appearance of filling with water, for example as in a thermometer with its rising fluid, to indicate the degree to which information 158 has changed. In these virtual reality systems, the virtual object representing information 158 may also have tactile characteristics that change in order to reflect characteristics of the remote information. For example, the mower may become squishy or firm (i.e. hard) if the information 158 represented by the mower is easy to access because of a rapid bandwidth to the remote information 158. Other tactile impressions such as malleability, texture, temperature, and vibrations are also possible. The degree of tactile experiences may reflect various characteristics of the information 158.

Examples of man-machine interfaces that permit force and texture feedback (e.g. tactile sensation) are given in U.S. Pat. No. 5,184,319 by J. Kramer issued on Feb. 2, 1993. This reference is herein incorporated by reference in its entirety.

The SCI may be used in an operating system to alter the schedule of updates controlled by the operating system. The SCI may be used in a multi-media environment to alter the update-schedule of various video windows or other multi-media objects. The SCI may be used for network control and with network control software to alter the access schedule of various network users. The SCI may be used by videoconferencing/teleconferencing users to alter the schedule of various audio-visuals. For example, a videoconference via computer may consist of several windows showing text presentations, animations of people in the room, sound, and "chat" text windows—the schedule or subscription of which can be controlled by the SCI. The SCI may be used to set the subscription rate for various information-search services. For example, a financial service may use this to control the frequency of stock information updates and notifications, and search frequency, depth, and access to resources such as provided by different databases. The service provider may use this to improve the schedule of service for customers who pay more money, or the customers themselves can increase the schedule of information services using these methods if the users are willing to pay more money.

The ideas in this invention apply to various arenas in which subscription schedules are important, including all aspects of "push technology" where data from the Internet is periodically pushed to a user's desktop. In various control centers, touch screens may be useful to move graphical objects to the SCIs.

Given this disclosure alternative equivalent embodiments would become apparent to one skilled in the art. These embodiments are also within the contemplation of the inventors.

I claim:

1. A schedule-controller icon displayed on a graphical user interface of a computer system, the icon comprising:
   one or more locations, each location associated with a subscription schedule rate and a first location being one of the locations; and
   a threshold distance for each of the locations, where one or more icons, representing one or more web page links, is placed on the graphical user interface within the threshold distance of the first location causing the subscription for the icon to be assigned an update schedule of the first location.

2. A schedule-controller icon, as in claim 1, where the threshold distance is zero, so that the icon is dropped on the schedule-controller icon first location.

3. A schedule-controller icon, as in claim 1, where the locations also have one or more graphical attributes that are associated with one or more characteristics of the respective update schedule.

4. A schedule-controller icon, as in claim 3, where the icon changes one or more of the graphical attributes when the update schedule of the first location is changed.

5. A schedule-controller icon, as in claim 3, where the graphical attributes include any one of the following: color, brightness, text font, texture, outline, blink rate, shape, and size.

6. A schedule-controller icon, as in claim 1, where the locations are a continuous visual index.

7. A schedule-controller icon, as in claim 6, where the update schedule at one or more of the locations on the continuous visual index are interpolated.

8. A schedule-controller icon, as in claim 1, where one or more of the locations is a distinguished region of the graphical user interface.

9. A schedule-controller icon, as in claim 8, where the distinguished region is visually distinguished.

10. A schedule-controller icon, as in claim 9, where the distinguished region is visually distinguished by any of the following: color, outline, texture, are brightness.

11. A schedule-controller icon, as in claim 8, where the distinguished region is spatially distinguished.

12. A schedule-controller icon, as in claim 1, where one or more of the locations is a cutout on the schedule-controller icon.

13. A schedule-controller icon, as in claim 12, where there is a visual indication of binding when the icon is within the threshold distance.

14. A schedule-controller icon, as in claim 1, that has a textual description display on the schedule-controller icon.

15. A schedule-controller icon, as in claim 1, that is three dimensional.

16. A schedule-controller icon, as in claim 15, that is used in a virtual reality graphical user interface.

17. A schedule-controller icon, as in claim 16, that has any one of the following depictions: shelf, cabinet, compartment, and container.

18. A schedule-controller icon, as in claim 1, that is used to organize one or more icons representing web pages by one or more icon classes.

19. A computer system with a computer memory and a central processing unit, comprising:
   a graphical user interface;
   one or more schedule-controller icons displayed on the graphical user interface, each of the schedule-controller icons having one or more locations, each location associated with an update schedule, and a first location being one of the locations; and
   a threshold distance for each of the locations, where an icon, representing a web page, is placed on the graphical user interface within the threshold distance of the first location causing the web page represented by the icon to be assigned the update schedule of the first location.

20. A system, as in claim 19, where one or more of the schedule-controller icons is associated with a class of one or more web pages and only can change the update schedule of the pages in the class.

21. A system, as in claim 19, where the computer is a server on a network of computers.

22. A system, as in claim 21, where the server uses one or more schedule-controller icons to alter the access schedule of one or more network users.

23. A system, as in claim 19, where one or more of the schedule-controller icons is used to alter the update schedule of one or more tasks controlled by an operating system of the computer.

24. A system, as in claim 19, further comprising:

a network connection to a network; and a receiver that receives information over the network, information causing a graphic attribute to change.

25. A system, as in claim 24, where the changing graphical attribute belongs to the schedule-controller icon.

26. A system, as in claim 24, where the changing graphical attribute belongs to the icon.

27. A system, as in claim 24, where the changing graphical attribute changes a region of the schedule-controller icon.

28. A system, as in claim 24, where the changing graphical attribute changes a region of the icon.

29. A system, as in claim 24, where the information includes any one or more of the following: a bandwidth status, an access requirement, a change in status, a memory requirement, an information format, an update, a presence of images, an absence of images, and an information content.

30. A system, as in claim 29, where two or more information items are combined by a mathematical relation to determine the change in the graphical attribute.

31. A system, as in claim 19, where one of the locations further specifies a nature of one or more updates.

32. A system, as in claim 31, where the nature is any one or more of the following: an e-mail, a screen text, a web page, a file transfer protocol (FTP), and a notification.

33. A method of assigning an update schedule to a web page subscription running on a computer system comprising the steps of:

a. selecting an icon that represents the web page on a graphical user interface;

b. moving the icon to within a threshold distance of first location being one of one or more locations on a schedule-controller icon; and c. assigning the web page represented by the icon an update schedule the is associated with the first location.

34. A schedule-controller icon displayed on a graphical user interface of a computer system, the icon comprising:

one or more locations means for designating an update schedule and a first location means being one of the location means; and a threshold distance means, for each of the location means, for determining if an icon means, representing a web page, is placed on the graphical user interface within the threshold distance means of the first location means so that the web page represented by the icon means is assigned the update schedule of the first location means.

* * * * *